Sept. 29, 1942. W. J. MILLER Re. 22,187
METHOD AND APPARATUS FOR MANUFACTURING POTTERYWARE
Original Filed March 1, 1929 3 Sheets-Sheet 1
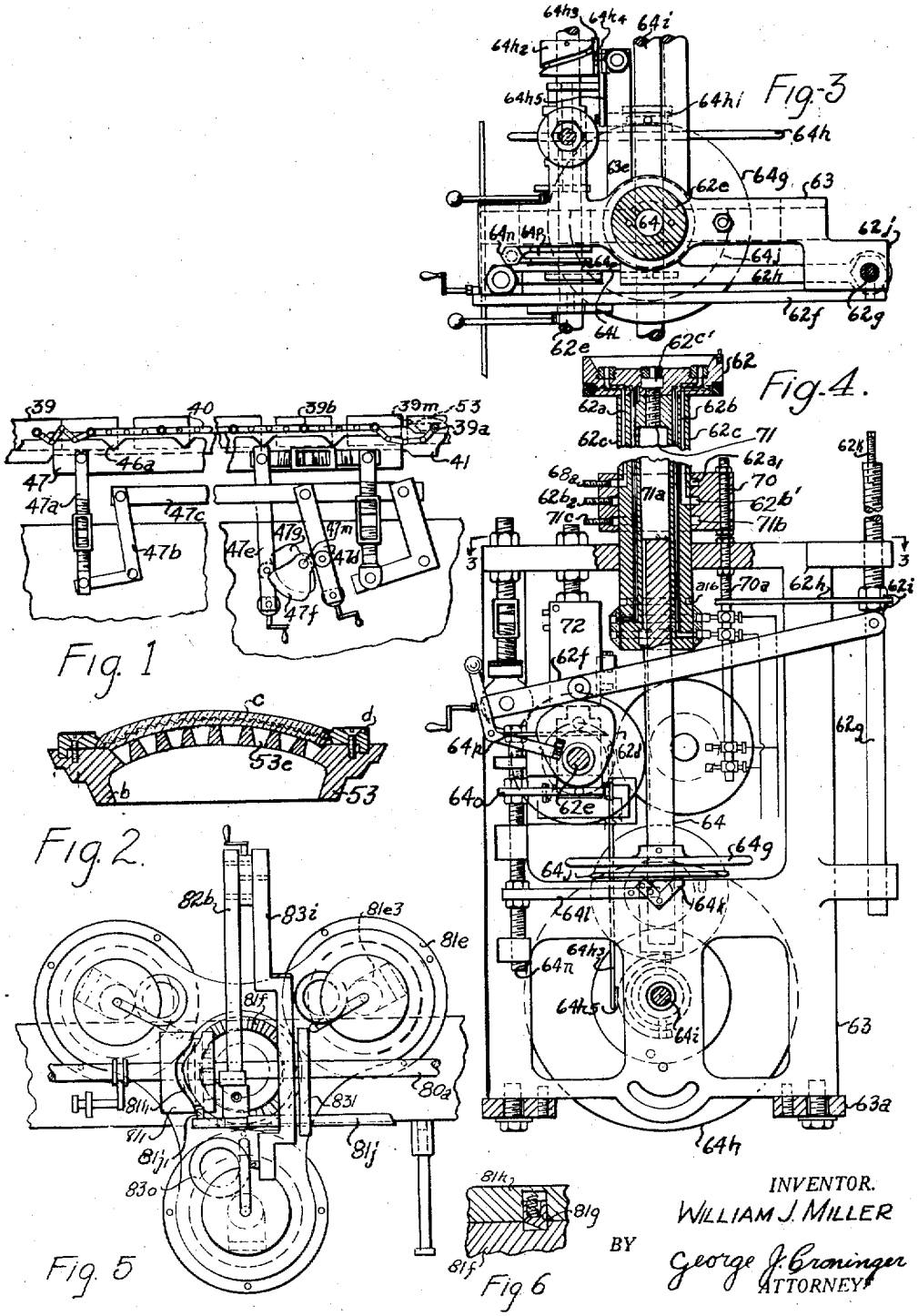
INVENTOR.
WILLIAM J. MILLER
BY
George J. Broninger
ATTORNEY METHOD AND APPARATUS FOR MANUFACTURING POTTERYWARE
Original Filed March 1, 1929 3 Sheets-Sheet 2
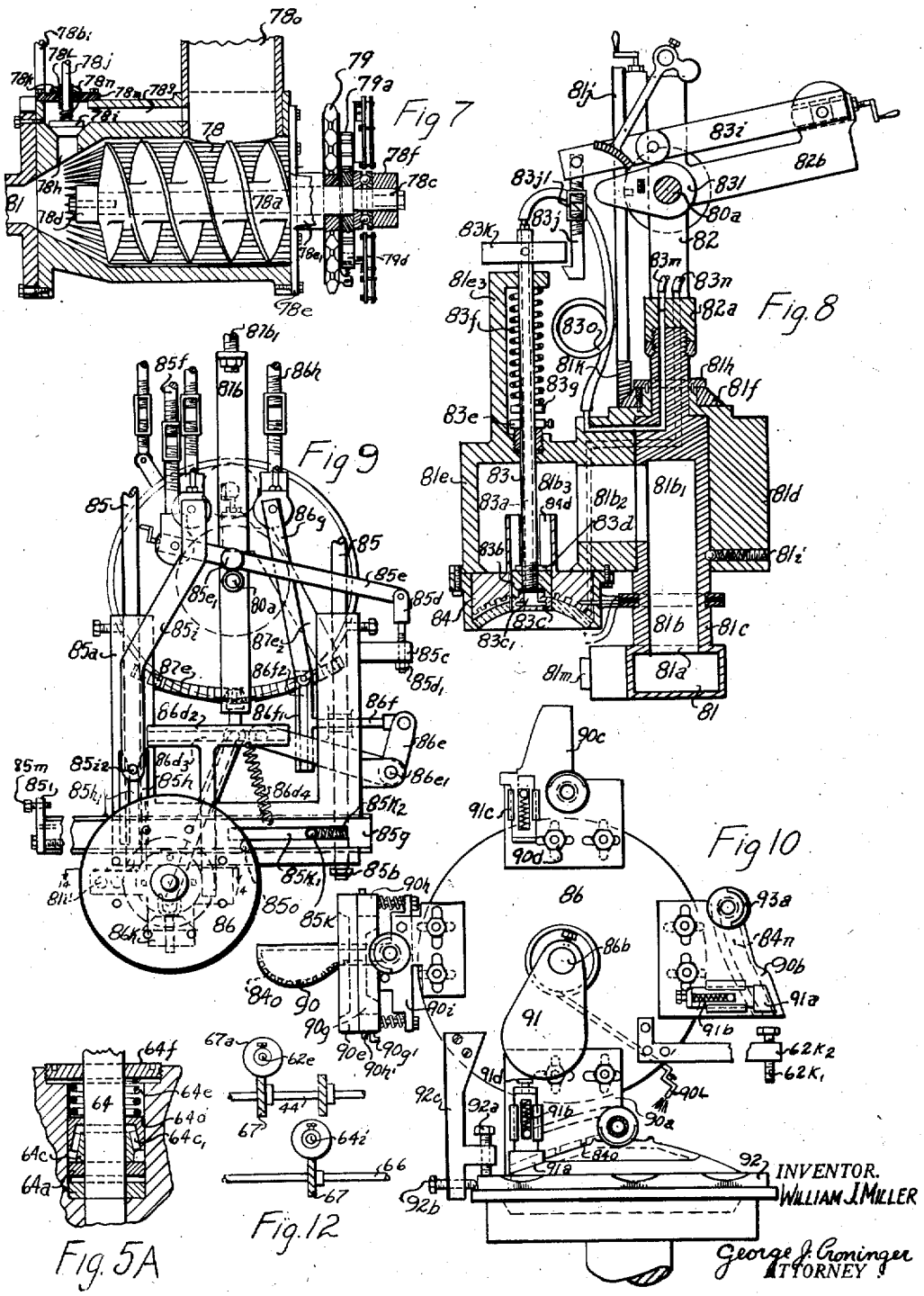

METHOD AND APPARATUS FOR MANUFACTURING POTTERYWARE
Original Filed March 1, 1929 3 Sheets-Sheet 3
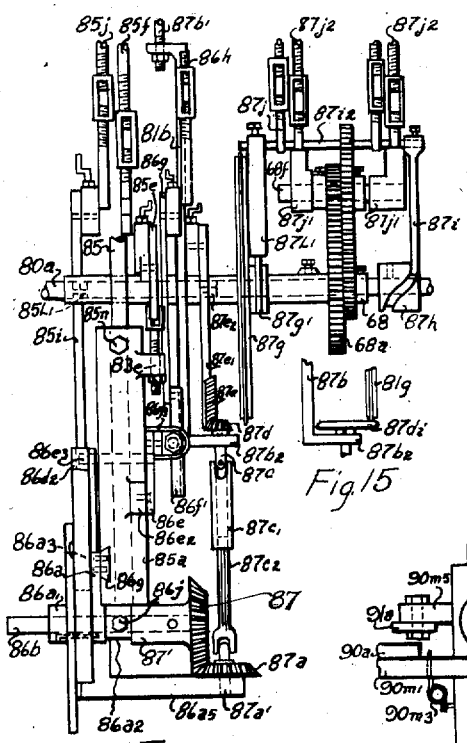
Fig. 11
Fig. 15
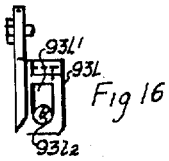
Fig 16
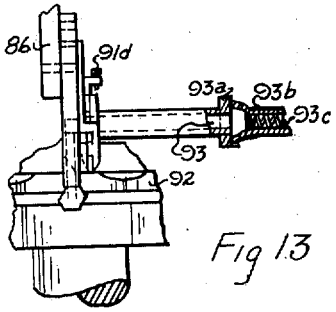
Fig 13
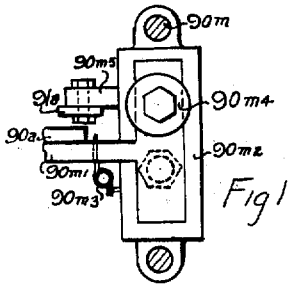
Fig 17
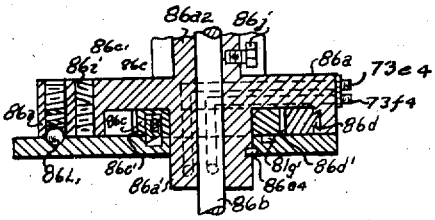
Fig. 14
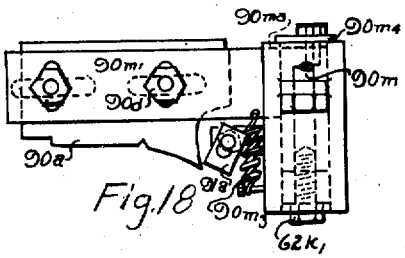
Fig. 18
INVENTOR.
William J. Miller
BY
George J. Croninger
ATTORNEY.

Reissued Sept. 29, 1942

Re. 22,187

UNITED STATES PATENT OFFICE 22,187

METHOD AND APPARATUS FOR MANUFACTURING POTTERYWARE

William J. Miller, Swissvale, Pa.

Original No. 2,243,880, dated June 3, 1941, Serial No. 69,776, March 20, 1936, which is a division of Serial No. 343,693, March 1, 1929. Application for reissue April 24, 1942, Serial No. 440,332

63 Claims. (Cl. 25—22)

This invention relates to a method of and apparatus for producing pottery ware, and the principal object of the same is a machine and process whereby this class of ware may be manufactured more expeditiously and economically than with known machines now in use, the apparatus possessing numerous advantageous features of construction and operation inaugurated with a view toward improving the grade of ware and at the same time facilitating volume production with a minimum amount of manual attention.

This application is a division of my co-pending application for United States Letters Patent Serial No. 343,693, now Patent No. 2,046,525, filed March 1, 1929.

In practicing the method the molds in which the ware is formed and fabricated are disposed on open bottom trays and the latter mounted in series in an endless flexible, preferably continuously-driven, conveyor which progresses the molds adjacent instrumentalities for applying clay to the molds and jiggering the same, the trays being temporarily halted thereat whilst the production operation ensues, the molds being accessible from below the trays, reciprocable and rotatable chucks serving to elevate the molds from the trays into operative adjacency to the instrumentalities mentioned and rotate the same where required.

The complete apparatus as disclosed in the parent application includes automatically operated units or assemblies for producing ware of different designs, such for example as plates, cups, bowls, saucers and the like, means being provided for jiggering or shaping certain articles of ware which would otherwise have to be cast, and only such of these units need be placed in operation as may be required in manufacturing a particular line of ware, as where plates only are being manufactured. This divisional application has to do particularly with the production of diversified shapes in succession in one or more production lines at speeds commensurate with the production of uniform shapes in one or more lines. The application is concerned with the dominating formative procedure and apparatus, to wit: the jiggering phase of the production cycle embracing the feeding, preforming or adhesively bonding the clay to the mold whilst it is being spread and given an approximation of final ware form and the final step of profiling which includes trimming and the removal of excess material, and all of this only in conjunction with the production of diversified shapes in succession.

Basically, this divisional application contemplates the line production of diversified ware through the use of novel apparatus of a character such that a multiple of instrumentalities for co-operation with molds of diverse character may be carried thereby and may be operated in timed relation with the presentation and mechanical manipulation of molds so that the proper charge of clay, bat and final piece for a particular mold may be produced in succession. In short, the instrumentalities for cooperation with the molds are alternated automatically and the preferred apparatus for accomplishing this resides in the form of a turret synchronized with the mold conveyor and mounting tools or fabricating implements of diversified character, all as will be hereinafter explained.

The objects of the invention are to enable form diversity on a single production line and high form diversity where a multiple of lines are operated in conjunction; to provide novel apparatus for mounting and controlling the alternation, presentation and withdrawal of various fabricating instrumentalities and the control and regulation of the size, bulk or volume of the clay charge; to facilitate and expedite the charging of molds with clay, jiggering of the clay and the removal and disposal of excess clay.

In the drawings:

Fig. 1 is an enlarged fragmentary view in side elevation of a portion of the conveying mechanism.

Fig. 2 is a sectional elevation of a mold for shallow ware.

Fig. 3 is a horizontal sectional plan view taken on the line 3—9 of Fig. 4.

Fig. 4 is a view in section and side elevation of a mold actuating or jigger assembly.

Fig. 5 is a plan view of the extruding means forming part of the feeder assembly.

Fig. 5A is a detail view of a part of the mold actuating assembly of Fig. 4.

Fig. 6 is a detail view in section of a detent.

Fig. 7 is a transverse vertical sectional view of the clay progressing and compacting means forming part of the assembly for feeding charges of clay to the molds.

Fig. 8 is a view in transverse vertical section of the extruding means forming part of the feeder assembly.

Fig. 9 is a view in front elevation of a tool or attachment carriage to which the jigger tool turret and attachments are applied.

Fig. 10 is a view in front elevation of the profile and trimmer assembly.

Fig. 11 is a detail side elevation of the assembly of Fig. 9.

Fig. 12 is a reduced fragmentary view of a drive unit.

Fig. 13 is a broken side or edge elevation of one of the profile units of Fig. 10 in co-operation with a mold and disclosing the excess clay removing apparatus.

Fig. 14 is a section taken on the line 14—14 of Fig. 9.

Fig. 15 is a fragmentary detail of an optional drive means for the apparatus of Fig. 11.

Fig. 16 is an end elevation of a profile cleaner.

Fig. 17 is an end elevation of a profile mounting shown in Fig. 18 and Fig. 18 is a side elevation of a profile and actuating frame.

The various fabricating units herein disclosed are mounted in such order along the fabricating line as will permit each operation to be performed in proper sequence in accordance with the article of ware being produced. These units, as far as the present application is concerned, are a clay feeding apparatus adapted for single or multiple line operation; preforming apparatus including die formers, plungers and turret devices on which the dies, plungers, etc. are mounted and jiggering apparatus, including profiles, trimmers, excess clay handling devices and turret devices for the profiles together with a mold conveyor and actuating means therefor, means for operating the turrets in timed relation therewith and reciprocable and/or rotatable chucks for the reception and manipulation of molds adjacent the feeding, preforming and jiggering apparatus.

The molds in or on which the ware is fabricated are disposed on open bottom trays or carriers 39, Fig. 1, which are swingably mounted in series in endless flexible chain conveyors 40 by hollow projecting trunnions 39*a*, Fig. 1 having rollers 39*b* rotatably mounted thereon, these rollers having concave peripheries which assist in centering the trays laterally while supported on tracks 41. These tracks are adjustably secured to the machine frame and support the trays moving in on one side and out on the other of the fabricating apparatus. The trays 39 have mold supporting plates 39*m* mounted thereon in spaced alignment and each support is adapted to carry a mold and the molds on succeeding supports in any one particular line, may be arranged for the production of ware of different size, shape or configuration.

The conveyor 40 is driven by sprocket shaft 44 to provide for intermittently halting the trays in the zone of the fabricating apparatus at the feeding, preforming and jiggering stations, a predetermined amount of slack is provided in the conveyor chain as described in my application Serial No. 343,693 and my United States Letters Patent No. 1,856,498.

In the zone of the various fabricating machines, the trays are supported on tracks 41 arranged on each side of the machine. The trays ride on these tracks on their rollers 39*b* and adjacent each fabricating position the track is notched for the purpose of positioning the trays relative to the machine chucks and the fabricating machines. The trays in the zone of the fabricating machines are advanced by mechanism comprising an elongated pair of rails 47 having a plurality of equidistantly spaced notches 46*a* which are adapted to pick up the trays by their trunnions and advance several of the trays simultaneously from one fabricating position to another.

Means for actuating the rails in the aforesaid manner comprises a cam 47*f* which moves lever 47*d* to the right, causing the bar 47*c* to turn bellcrank 47*b* and thus raise the rods 47*a* which are pivotally attached to the rails 47. The cam 47*g* is for the purpose of shifting the rails longitudinally through rod 47*e* to advance the trays to the next position after they have been elevated, the trays being subsequently lowered into the next succeeding set of notches on bars 41 after which the transfer returns to initial position. The chain sprockets (not shown) are driven in synchronism and the slack is periodically accumulated and dissipated on opposite sides of the halted tray or trays, the links buckling as shown at the left in Fig. 1 and permitting abutting trays to move into close-up relation.

Hollow or flatware may be made on the machine and for purposes of illustration, one type of flatware mold is shown at 53, Fig. 2, having a base B and a renewable absorbent plaster body C as shown and described in my co-pending application. The base B, Fig. 2, is preferably provided with ventilating openings 53*e* to accelerate the extraction of moisture, facilitate the drying action and permit the application of super- and/or subatmospheric pressure and analogous treating fluids to the clay incident to fabrication.

As the trays bearing the molds progress along the main fabricating line, they are intermittently halted over reciprocable and rotatable chucks 62 forming part of the mold actuating units shown in Fig. 4, these chucks being located at the feeding, preforming and jiggering stations for the elevation of the molds into co-operation with the various fabricating units and rotation where required. The complete assembly is mounted on a skeleton frame 63 adjustably secured on supports 63*a*. The frame 63 is provided with transversely aligned spindles 64, Fig. 5A, having collars 64*a* supporting a tapered thrust collar 64*c*, bearing rollers 64*c'*, saddle 64*d* and spring 64*e* abutting against cover 64*f*. The spindle moves upwardly against the tension of spring 64*e* and lowers by gravity.

Spindle 64 is in spline-sliding engagement with chuck spindle 62*c*, Fig. 4, on which chuck 62 is secured, reciprocation being imparted to chuck 62 and spindle 62*c* by cam 62*d* on cross shaft 63*e*. The cam operates lever 62*f*, which is adjustably pivoted at one extremity, the pivoting assembly being supported from the frame 63, and at its opposite extremity pivotally secured to a pitman 62*g*, the pitman connecting with spindle 62*c* by means of a cross fork 62*h*, which is adjustably secured to said pitman by nuts 62*i* at its one extremity and forked into an annular groove 16*a* in the spindle 62*c* at its opposite extremity. The pitman 62*g* projects through and is guided by extensions 62*j* of the frame 63, the upper end of said pitman having adjustably threaded therein a contact screw 62*k*, the function of which will later become apparent.

Rotation may be imparted to spindle 64 in the unit shown in Fig. 4 by means of co-operative friction gears 64*g* and 64*h*, Figs. 3 and 4, the gear 64*g* being adjustably secured on the spindle 64 and the gear 64*h* splined for longitudinal sliding movement on a continuously driven cross shaft 64*i*. The friction gears are brought into intermittent contact by lever and brake assembly comprising a brake shoe 64j formed with studs for mounting the shoe for vertical movement on the frame 63, a bell-crank lever 64k, connecting rod 64l, pitman 64n and cam contacting arms 64o and 64p. Arms 64o and 64p are alternately raised and lowered by individual cams, not shown, mounted on shaft 62e.

To vary the speed of rotation of the chuck during reciprocation, friction gears 64h have a grooved collar 64h' splined on shaft 64i, Fig. 12, and a grooved cam 64h2 on shaft 62e, Fig. 4, motion being transmitted from the cam to the gear by a lever 64h3, and lever having a pin 64h4 working in the groove of cam 64h2. At its lower extremity the lever connects with the grooved hub 64h1 through link 64h5.

In operation, the chuck reciprocating cam 62d and brake cams being adjusted to work in synchronism when the chuck spindle and chuck elevate, the brake 64j is released permitting spindle 64 to lower and thus lowering gear 64g into contact with the continuously rotating gear 64h and imparting rotation to the chuck. When the chuck is lowered, brake 64j raises and engages gear 64g, raising spindle 64 and disengaging gears 64g and 64h stopping rotation of the chuck.

The shafts 64i and 62e may be driven from the main drive shaft in the machine through, in each instance, helical gears 67a and 67, Fig. 12.

Super and sub-atmospheric pressure, and other mediums may be applied to the molds through the chuck for various fabricating operations, the passages 62a and 62b extending down into the chuck spindle 62c and opening out into annular registering grooves 62a' and 62b' formed in a hood 70 having a working fit around the spindle and adjustably supported on the frame 63 by rod 70a, hose nipple 62a2 and 62b2 being threaded into the hood 70 and communicating with the grooves. A further communicating passage opening out in the bottom of the chuck is provided by a bore 71 in the screw 62c', the interior of the spindle 62c being hollow, thus forming a chamber 71a, and the hood 70 having a further groove 71b both in communication with said chamber, a hose nipple 71c being threaded into the hood 70 and communicating with said groove. Where the passages 62a, 62b and 71 open out into the chuck 62, resilient sealing and cushioning pads are adjustably threaded into the chuck. The fluid is controlled by cam operated valves 72, described in the parent application.

The assembly just described is preferably operated in conjunction with the jigger unit and may be mounted in multiple according to the number of fabricating lines being operated, the shafts 64i and 62e, Figs. 4 and 12, being common to all of the units if desired. The present mold elevating assembly may be adapted for use at the feeder position but in that event, the gears 64h would be disengaged and the chuck held against angular movement, since it does not rotate at this station.

The clay of which the ware is to be formed is taken from the conditioning apparatus in the usual cartridge or slug form and disposed in a hopper 78o opening into a progressing and compacting chamber 78, Fig. 7, having a driven screw 78a working therein which progresses and compacts the clay into a conduit 81 extending transversely of the machine across the lines of molds and common to a multiple of feeders. From this conduit the clay is forced into extruding chambers and segregated and extruded into or on the molds by reciprocating plunger assemblies.

The chamber 78 is formed with a supporting bracket adapted for posts 78b' which are secured in one of the top plates of the machine and by means of which the entire feeder assembly may be adjustably supported over the mold-actuating assembly. The screw 78a is preferably formed in sections and the required number of these sections are assembled on the squared portion of a shaft 78c and secured from endwise displacement by an end cap 78d, said shaft having bearing in a detachable head 78e formed with a hub 78e' and bracket 78f, the bearing being provided with the usual packing gland and packing to ensure against leakage and wear.

The walls of the chamber 78 are preferably fluted longitudinally to prevent angular movement of the clay, and in the top wall a return passage 78g is formed, the inlet 78h of which is shaped to seat a valve 78i provided with a stem 78j having a sliding fit in an exteriorly-threaded sleeve 78k against the resistance of a spring 78l, said sleeve being adjustably threaded in a cover plate 78m and secured by lock nut 78n, and the outlet of said passage opens into the hopper 78o. By adjusting sleeve 78k, the unseating pressure of valve 78 may be regulated to thereby regulate the operating pressure in the conduit 81. When the valve unseats, clay is permitted to pass through the return passage 78g back into the hopper 78o.

The screw 78a is preferably, but not necessarily, intermittently driven by a continuously-rotating sprocket gear 79, which is rotatably mounted on shaft 78c, and an intermittently-rotating ratchet gear 79a, all as described in my co-pending application.

In operation, the continuously-rotating gear 79 carries a pivotally-mounted dog 79d around the periphery of ratchet 79a, the dog being alternately thrown into and out of mesh with said ratchet by adjustable trip cams. Power for driving the screw 78a may be taken from the main drive of the machine which extends along the side of the machine, motion being transmitted from this shaft through various cross shafts 80a, as in Fig. 5 for the fabricating units by means of helical gears 67 and 67a similar to those used for the shaft 44 and cross shafts 62e, Fig. 12.

Referring now to Fig. 8, the clay compacting in the conduit 81 is forced upwardly through openings 81a, formed in the top of the said conduit and into a chamber 81b formed in a pivot post 81c, and from the chamber 81b the clay passes through registering openings 81b' and 81b2, respectively formed in the side wall of the post 81c and the hub of a pivoted turret casting 81d, and into one of a series of chambers 81b3 formed in a multiple of radial cylinders 81e forming part of the turret 81d, from which the clay is extruded into or on the molds. While the clay could be extruded direct from the conduit 81 onto the molds, the construction here shown is adapted for producing different kinds of ware in succession, as where plates, cups and saucers are being formed in one line of molds. The turret 81d, therefore, may be rotated on the pivot post 81c in synchronism with the mold conveyor to bring each cylinder over a mold as it is advanced in line if different types of molds are in the same line.

The upper extremity of the turret 81d is formed with a shoulder and trunnion to receive a gear 81*f*, which is rotatably mounted thereon, the gear being recessed to house a resiliently mounted latch or detent 81*g*, Fig. 6, the shoulder being formed with a number of recesses in accordance with the number of extruding cylinders 81*b*3, here three. After the gear and detent assembly have been applied, the gear is secured from displacement by a cap 81*h*. The side of the turret 81*d* is also bored to receive a spotting or positioning detent assembly 81*i*, Fig. 8, and the side wall of the pivot post 81*c* is formed with a plurality of notches, here three, so that when the turret is rotated to its approximate angular position, it is spotted by said detent.

The upper extremity of the pivot post 81*c* is threaded and thereon is adjustably mounted a lever-supporting bracket or post 82, the lower extremity of which is rounded and enlarged as at 82*a* and threaded over the post 81*c* and secured by lock nut 82*a*′, said bracket 82 also being cast with a branch bracket 82*b*. On the upper extremity of this bracket 82, a lever 81*j* is adjustably pivoted, said lever 81*j* terminating to a gear segment 81*k*, which is in continual mesh with the turret gear 81*f*. The lever 81*j* is oscillated by a groove cam 81*l*, which is formed with a groove 81*l*, and adjustably secured as on shafts 80*a*, said lever being provided with a pin 81*j*′ which engages in said groove.

As the cam 81*l* rotates, lever 81*j* is oscillated, thus oscillating turret gear 81*f*, the length of the stroke being adjusted in accordance with the angular spacing of the detent slots in the shoulder of the turret 81*d*. Thus, if the turret is to be intermittently rotated counter-clockwise, the detent is turned so that the toe of its beveled end faces in that direction, and if clockwise, the detent is simply turned in its socket accordingly, while if the turret is to be oscillated back and forth, the detent is turned to an intermediate position.

As the clay is progressed into the chamber 81*b*3, it is extruded therefrom in measured charges by reciprocating plungers, each of which comprises a stem 83, which is hollow or formed with a longitudinal bore 83*a*, the lower extremity of the plunger being threaded to adjustably receive a socket 83*b*, in which is threaded a porous head 83*c* composed of material such as plaster of Paris and having a chamber 83*c*′ therein, the bore 83*a* terminating in said chamber. The head may be secured in adjusted position by a lock nut 83*d*. The stem 83 extends upwardly through the top of the cylinder 81*e*, which is provided with a packing gland 83*d*, said cylinder being formed with an extension guide bracket 81*e*3 for said stem, the latter moving upwardly against the compression of a spring 83*f*, which encircles the stem 83 and is adjustable by a collar 83*a* threaded on said stem. A contact nut 83*e* is also adjustably threaded on the stem 83, to adjust the lowermost point of reciprocation or travel of the plunger.

The extruding plungers are forced upwardly against the compression tension of springs 83*f* by a lever 83*i*, adjustably pivoted at one extremity, Fig. 8, on the bracket 82*b*, and at its opposite extremity said lever has pivotally mounted thereon a hook 83*j*, adjustably by turnbuckle 83*j*′, said hook engaging under a collar 83*k*, which is adjustably secured on each plunger stem 83. Lever 83*i* is actuated by a cam 83*l*, which is adjustably mounted on the shaft 80*a*, Fig. 5.

Means are provided for applying a treating medium, such as fluid at super and sub-atmospheric pressure or electricity to the clay charges, the rounded part 82*a* of bracket 82 and the upper extremity of post 81*c* being formed with registering bores or the passage 83*m* connecting with the plunger bore through a hose 83*o* and the passage 83*n* leading down through the turret and terminating in an exuding chamber in an upper die generally designated by the numeral 84. The passages 83*m* and 83*n* are under the control of a valve or valves such as that at 72, Fig. 4.

To provide for progressing different grades and mixtures of clay into one conduit and feeding a particular mix or grade into a particular advancing line or lines of molds, it is preferred to mount the progressing and compacting assembly shown at both ends of the conduit 81, and the extruding orifices along the conduit may be separated from one another by slide valves 81*m*. Thus, a certain grade or mix of clay may be progressed into each end of the conduit and maintained separate by the slide valves, or if it should be desired to feed a different grade or mix of clay to each line of molds, a separate feeding chute and screw could obviously be provided for each extruding assembly.

The feeder assembly as a whole is adapted for use with the mold actuating units described in connection with Fig. 4 and it will be seen that the charges of clay may be treated on all sides, viz: through the plunger head 83*b*, upper die or former and the mold.

The operation of the feeder should now be understood. The clay may be deposited in the hopper 78*o* in the usual cylindrical roll as it is taken from the conditioning apparatus, the screw 78*a* being intermittently actuated to progress and compact the clay in a homogeneous mass into the conduit 81, from which it is forced upwardly through the chamber 81*b*. If the turret is to be rotated to feed different types of molds in succession, the detent 81*g* is turned in the proper direction, and as the openings 81*b*′ and 81*b*2 register, the clay passes into the chamber 81*b*3, from which the feeding plungers eject or extrude and segregate it in measured charges against the molds, which are preferably elevated to the upper die and form a confining chamber substantially bounded on all sides by porous material and into which the clay is extruded, the descending plunger completing the walls of the chamber. The feeding plungers need only be raised to a point sufficient to permit approximately the correct quantity of clay to pass into the feeding orifices, the side walls of which form an accumulating chamber or well and at which time it is preferred to partially rotate the screw 78*a*, whereupon the descending plungers move into the orifices and eject the clay in the form of a column onto the molds with sufficient force to cause it to adhere thereto, the column spreading radially over the molds and expelling the air from the gradually closing chamber, until the molds and upper dies meet, at which time or shortly thereafter the charge is completely extruded by the descending plunger head.

It is preferred to leave a clearance space between the plunger head 83*c* and side walls of the extruding orifice or well 84*d*, to permit back extrusion of excess material into the chamber 81*b*3.

Suction may be set up through the porous mold, plunger head and die facing, which will not only withdraw air but increase adhesion of the clay to the mold and speed up the drying action. The effect of suction is supplemented by the mechanical pressure exerted on the clay by the extruding plungers.

No attempt is made herein to enumerate the many methods of treating the clay charge through the porous walls which encompass the chamber formed by the mold, die facing and plunger head and into which the charge is extruded. However, in the event the clay should tend to adhere to the upper die and plunger head air under pressure may be applied to ensure release of the clay or a suitable fluid or liquid applied so that the plaster head and facing will be maintained in a moist and slippery condition, and in conjunction with the foregoing, sub-atmosphere or action may be applied through the porous mold which will cause the clay to adhere thereto and also evacuate excess moisture and air pockets. The vents 53e' may be formed around the mold where the peripheral edge of the ware terminates so that when suction is applied, it will assist the expansion of the charge and ensure complete coverage of the mold. Ordinarily, the porous material will permit the treating medium to pass therethrough and it will not be necessary to provide ducts or vents unless it is desired to selectively apply said medium. By establishing a sub-atmospheric condition between the chuck and mold, the latter will be held firmly on the chuck and be prevented from sticking to the upper die if there should be any tendency in that direction. In the event it is desired to apply super-atmospheric pressure to the under-portion of the mold, the chuck may be magnetized as disclosed in my co-pending application to maintain the mold and chuck in association.

After the molds in a line transversely of the conveyor have been filled, the tray is advanced one division by the bar 47 to the next station which may be the jiggering or profiling station. The profiles are mounted on turrets suspended over each line for alternating the various tools in accordance with the article presented for jiggering and the turrets are supported by an assembly which comprises a vertical guide 85, Figs. 9 and 11, and stop posts which are adjustably secured in and depend from one of the top plates of the frame. A frame 85a shown as of rectangular shape is mounted to have a vertical sliding fit on said posts, nuts 85b being threaded on the lower extremities of said posts to adjustably limit the lowermost point of travel of said frame. The frame 85a is formed with a bracket 85c, which is bored to receive a pivot bolt 85d, which is adjustably secured by nut 85d', a lever 85e being pivoted at one extremity in said bolt and at its opposite extremity adjustably and pivotally supported from a post 85f, which also depends from and is secured in the top plate. This lever 85e is provided with a cam roller 85e' adapted for contact with various types of frame-actuating cams shaped in accordance with the work involved and which are mounted on one of the cross shafts 80a.

The lower portion of the frame 85a is formed with a dovetail slot or groove in which a bar 85g is mounted to have a horizontal sliding fit, the bar at the left as viewed in Fig. 9 being formed with a vertical guide bracket 85h having a central slot or track 85hi. A lever 85i provided with a cam roller 85i' is pivotally and adjustably supported at its upper extremity from a post 85j, and at its lower extremity said lever is provided with a pin 85i2 adapted to have a working fit in said track 85h'. As in the case of lever 85e, the cams for the lever 85i are given the required contour in accordance with the work involved and are mounted on one of the cross shafts 80a.

The bar 85g is slotted at 85k1, a pin 85 being secured in the frame 85a, a compression spring 85k2 being mounted to abut at opposite ends, respectively, against said pin and the bar 85g. The bar 85g is also provided with a screw bracket 85l in which a contact screw 85m is mounted, which serves to adjustably limit the movement of bar 85g in one direction independently of its cam travel or reverse movement. The screw bracket 85l is adapted to be attached at either end of bar 85g and the spring 85k2 at either end of slot 85k, to conform to the positive direction of movement of the cam lever 85i.

It will be seen that when levers 85e and 85i are oscillated, the frame 85a reciprocates vertically and the bar 85g laterally the bar deriving its vertical movement from said frame. The frame is provided with screws 85n and 85o adapted to be adjusted in contact with the posts 85 and the frame 85a in the event the actuating cams are to be disconnected and the frame and bar set in rigid adjusted position.

An attachment and tool mounting turret disk 86, Fig. 10, is supported from the slide bar 85g, Figs. 9 and 11, by means of a hanger bracket 86a, said bracket being formed with projecting hub portions 86a' and 86a2 and is secured to the bar 85g by screws 86a3, the disk 86 being rotatably mounted on the hub 86a' and prevented from lateral displacement by a ring. A shaft 86b extends through and has bearing in the projecting hubs of bracket 86a, this shaft functioning in a manner which will later become apparent. The disk, like the feeder turret 81d, may be rotated intermittently in one direction or oscillated, detent such as 81g in Fig. 6 being housed, respectively, in a gear 86c, Fig. 14, and the bracket 86a and adapted to register in detent or latch notches 81g' and spotting notches 81i' formed in one side of said disk 86, there being four of each of said notches in the present instance. The gear 86c is mounted to rotate free on the bracket hub 86a' and the teeth 86c' of said gear are in continual mesh with the teeth 86d' of a rack 86d, the latter being slidably dove-tailed into a groove formed in the bracket 86a, see Fig. 9, and terminating in a T-head 86d2, which is formed with a track 86d3. The rack 86d is actuated by a bell-crank lever 86e, which is fulcrumed at 86e' on a bracket extension 86e2 formed on the frame 85a, the one extremity of said lever 86e being provided with a pin 86a3 which has a sliding fit in the groove or track 86d3, Fig. 9, while the opposite extremity of said lever has pivoted thereto, a connecting rod 86f which extends through a guide bracket 86f3 and terminates in a T-head 86f' formed with a groove or track 86f2, said T-head co-operating with a lever 86g pivotally supported at its upper extremity from a post 86h and at its lower extremity said lever is provided with a pin 86g' having a sliding fit in the groove or track 86f2 of T-head 86f'. Lever 86g is operated by a cam (not shown) mounted on shaft 80a, these cams also being generally shown with the respective attachments hereinafter described. A retracting spring 86d4 is secured at opposite extremities, respectively to the T-head 86d2 and the bar 85g.

A screw 86i is shown as threaded in the bracket 86a, this screw being adjusted against the turret disk 86 when it is desired to maintain said disk stationary with said bracket. A screw 86j is also shown threaded in the hub 86a2 of bracket 86a, and this screw may be adjusted against the shaft 86b when it is desired to maintain the latter stationary with said bracket.

The disk 86 is provided with a plurality of holes 86k for attaching various fabricating tools and attachments, such as shaping tools, turning and finishing tools and transfer chucks, which is desired in connection with each respective fabricating operation in my co-pending application supra. In the present application profiling instrumentalities are mounted thereon.

The shaft 86b may be driven by either a positive or friction drive, the friction drive being shown in Fig. 15 for the purposes of illustration.

A bevel gear 87, formed with a hub 87' is shown as adjustably secured on the shaft 86b, this gear meshing with a similar gear 87a secured on a stub shaft 87a' which has bearing in the projecting extremity of a bracket arm 86a5 formed as part of the bracket 86a. A bracket 87b is adjustably supported by a post 87b' from one of the top frame plates 38c and extends down and at its lower extremity is formed with a foot 87b2, a stub shaft 87c having bearing in said foot, this shaft forming part of a flexible coupling comprising a sleeve 87c' and longitudinally grooved shaft 87c2 in spline-sliding engagement with said sleeve, the lower extremity of shaft 87c2 being coupled for universal movement with the stub shaft 87c' on which gear 87a is secured. The stub shaft 87c of the flexible coupling has adjustably secured thereon a pinion gear 87d, which may be replaced by a friction gear 87d', see Fig. 15, when a non-positive, intermittent or continuous high-speed drive is desired. If pinion 87d is used, the drive is effected by means of a segmental gear 87e formed on a lever 87e', which is adjustably pivotally mounted on the bracket 87b and provided with a cam roller 87e2 adapted to contact with a cam to be mounted on shaft 80a or sleeve 68 and which may be given various contours in accordance with the rotation desired for shaft 86b. The lever 87e' may be retracated by a spring 87f.

If the friction or non-positive drive is desired, the friction gear 87d' may be substituted for pinion 87d and a cooperating friction gear 87g splined or mounted for longitudinal sliding movement on shaft 80a or sleeve 68, the latter gear being formed with a hub having an annular groove 87g' formed therein. A grooved cam 87h, adjustably mounted on shaft 80a, transmits longitudinal sliding movement to friction gear 87g by means of a pin 87i, slide rod 87i2 and pin 87i', the pins 87i and 87i' being adjustably secured on slide rod 87i2 which in turn is mounted to slide longitudinally in adjustable supporting brackets 87j which extend upwardly and are secured in one of the frame plates 38c.

If the rotation of shaft 86b is to be alternately reversed, the drum cam 87h may be used, this cam movement causing the friction gear 87g to move across the face of gear 87d' and when the gear 87g passes over the vertical axis of gear 87d', the rotation of said gear will be halted and then reversed, thus reversing the drive on said shaft 86b.

The jack shaft 68f of the change-speed assembly previously described in connection with Figs. 9 and 11 is shown as mounted and having bearing in hanger brackets 87j' which are also adjustably supported by posts 87j2 from one of the frame plates.

The fabricating attachments are mounted on the turret disk 86, Fig. 10, which is rotated in accordance with the particular attachments in use. If there are four attachments on the turret and all are being used in succession, the lever 86g may be actuated by a cam properly contoured to move the disk a quarter turn each machine cycle.

The profile and trimmer assemblies are shown in Fig. 10 as being mounted directly on the turret disk 86, there being four profiles 90, 90a, 90b and 90c shown, so that four different kinds of ware may be shaped in succession, or the turret disk oscillated to alternately move any two profiles into operative position. The profiles are adjustably secured to the disk 86 by slotting the disk and profile at right angles to receive attaching bolts, as at 90d, Fig. 18. Excess material openings 84o, see Fig. 10 sloped so as to present a scooping edge counted to rotation of the mold, are preferably formed in the profiles, these openings terminating in a cavity or channel 84n.

The profile 90 is for undercut ware and is provided with a resiliently mounted brim-forming ring 90e and adapted for application of sub- or super-atmospheric pressure or other fluid through the clay contacting face thereof to assist in releasing the clay therefrom, all as disclosed in my co-pending application. The ring 90e is rotatably mounted in a bearing or supporting ring 90h and held against displacement by pins 90h', so that the ring 90e may rotate with the mold while its supporting ring 90h remains relatively stationary, the hose nipple 90g2 being secured in the ring 90h and the latter formed with an annular groove or chamber in registration with the supply duct 90g'. The ring 90h is secured by threaded pins 90h2 to a bracket 90i, springs 80j being inserted over said latter pins to provide a resilient mounting for the assembly. The bracket 90i is slotted at 90k for the securing pins or bolts for the profile so that the profile and ring assembly have a relative lateral floating association.

It will be noted that the profile 90 does not require a trimmer in view of the ring 90e with its brim-contacting insert.

When the profile is removed from the interior of the undercut ware, it is first moved toward the left and then elevated, while at the same time the mold may be lowered.

Segment lever 87e is actuated by cam 87e3 for the purpose of rotating shaft 86b, which in the case of the profile assembly has adjustably secured thereon a trimmer-depressing cam 91, see Figs. 10 and 11, which depresses a trimmer 91a against the compression of a spring 91b, said trimmer being slidably mounted in brackets 91c, which may be formed on the profile, and has adjustably threaded in the top thereof a contact screw 91d which contacts with cam 91.

To insure accurate positioning of the profile relatively to the molds and uniform thickness of the ware, a contact screw 62k' may be adjustably mounted in a bracket 62k2 secured to the turret disk 86, said screw being adjusted to contact with screw 62k threaded into the top of the pitman 62g Figs. 4 and 10. When the mold and profile reach their approximate operative positions, the screws 62k and 62k' contact and the profile moves a short distance in unison with the mold.

If it is desired to produce irregular-shaped ware such as ovals and the like, the mold may be provided with a ring cam 92, contoured in accordance with the ware to be produced, the profile being guided by any suitable cam-contact means such as screws 92a and 92b, which are adjustably mounted in a bracket 92c secured to the disk 86, the screw 92*a* guiding the profile vertically and the screw 92*b* laterally, and as the slide bar 85*g* to which the turret-disk 86 is secured has a resilient yielding action in one direction and the frame 85*a* yields vertically against gravitational weight, the cam 92 may serve to guide the profile in shaping irregular-shaped ware. The profile could also be given the desired vertical and horizontal movements in producing irregular-shaped ware by the use of suitably-contoured cams for levers 85*e* and 85*i*.

A suitable fluid such as water may be automatically applied to the clay charge during profiling through the passages 73*e* and 73*f*, in Fig. 14 and a tube connected thereto terminating in a valved nozzle 90', Fig. 10. The fluid may be controlled by one of the valves 72, Fig. 4.

Figs. 17 and 18 illustrate a simplified form of profile assembly which it may be desired to use when the ware in one line is of the same shape. In this instance the assembly may be adjustably supported from one of the top plates by posts 90*m*. The profile 90*a* is adjustably secured on a slide bracket 90*m'* which in turn is mounted for vertical sliding movement in a guide and supporting bracket 90*m*2, the latter being supported by said posts 90*m*. The bracket 90*m'* moves vertically against the tension of a spring 90*m*3 secured at opposite extremities, respectively, to said bracket 90*m'* and bracket 90*m*2. The slide bracket 90*m'* has adjustably secured on top thereof a stop member or washer 90*m*4, which contacts with the guide bracket 90*m*2 when the profile is in its lowermost position. The trimmer 91*a* is adjustably secured on a bracket 90*m*5, which may be cast integral with, or secured to the bracket 90*m*2.

In operation, the screw 62*k'* may be adjusted relatively to screw 62*k*, so that when the mold elevates, these screws will contact when the profile has smoothed the ware to a predetermined thickness, whereupon the mold and profile move in unison to a point where the trimmer operates, after which the molds with the formed ware is lowered onto its tray 39. The horizontal operating position of the profile may be definitely limited by screw 85*m* and its angular position definitely spotted by a detent.

A bracket 92*c* carrying screws 92*a* and 92*b* may obviously be applied to the turret disk 86 for each profile assembly, and the use of this feature is not confined to the production of irregularly shaped ware, but said screws may serve as an alternate means or in addition to horizontal limiting screw 85*m* and vertical profile-limiting screws 62*k* and 62*k'*, for definitely limiting the horizontal and vertical operating position of each profile assembly.

As the profile shapes the ware, the excess material is forced into the openings 84*o*, Fig. 10, and chamber or passage 84*n* therebehind, the clay being removed from the latter passage by pressure which may, is desired, be aided by suction in a conduit member 93, Fig. 13, formed with a segmental flange 93*a* to facilitate registration with a conveying conduit 93*b*. The conduit member 93*b* may be supported from the frame and is positioned so that the flared inlet will yield slightly and register with the flanged terminal 93*a* of the conduit 93 when the turret is given a partial turn to bring one of the profiles into operative position. A screw conveyor 93*c* mounted in conduit 93*b* impels the excess material therethrough to a point of disposal. Suction could be substituted in conduit 93*b* for the screw 93*c* with the same result.

Fig. 16 illustrates a profile cleaner or scraper 93*l* having a funnel shaped chamber 93*l'* with a screw conveyor 93*l*$_2$ therein. This assembly may be mounted on the machine so that the profile scrapes the excess material into the chamber 93*l'* when disc 86, Fig. 10, rotates.

Having thus described my invention, what I claim is:

1. In a pottery fabricating machine, a turret member, a plurality of fabricating tools mounted on said member, reciprocable and rotatable chucks, a plurality of open-bottom trays linked in series by an endless flexible conveyor, means for advancing said trays in a substantially rectilinear plane between said turret member and chucks, and means for imparting angular movement to said turret member.

2. Apparatus for fabricating pottery ware, comprising a plurality of mold-carrying trays, means for advancing said trays, molds carried by said trays, fabricating mechanism mounted adjacent the line of travel of said trays and including a clay-feeding machine and a plurality of dies adapted for various types of molds, and means for intermittently altering the position of the said dies relatively to the advancing molds.

3. Apparatus for fabricating pottery ware, comprising a plurality of open-bottom mold-carrying trays linked in series, means for advancing said trays in a substantially rectilinear plane, fabricating mechanism mounted adjacent the line of travel of said trays and including a clay-feeding machine provided with a chambered turret member, a plurality of upper dies mounted on said turret member, means for progressing clay under pressure to said dies through said member, and means for intermittently rotating the turret to bring said dies into feeding position relative to the molds carried by said trays.

4. In apparatus of the class specified, a tool carriage, comprising an angularly movable member adapted to support the tool, vertically and horizontally movable frame components on which said member is mounted, and a system of cam-actuated levers for imparting angular movement to said member and vertical and horizontal movement to said frame components.

5. In apparatus of the class specified, the combination with a plurality of molds and means for advancing said molds in a substantially rectilinear plane, of a multiple of profiles each adapted for a particular shaped article of ware, support means on which said profiles are mounted, and means for imparting intermittent angular movement to said support means in synchronism with the advancing molds.

6. In apparatus of the class specified, means having a plurality of profiles mounted thereon, each of said profiles being formed with an extrusion conduit communicating with the working edge of the profile, means for imparting intermittent angular movement to the first named means to move the profiles into operative position, means including a relatively stationary conduit mounted adjacent the first named means, the receiving end of said latter conduit being adapted to register with a terminal end of said first-named conduit when the respective profiles move into operative position, and a means for removing excess material from said conduits.

7. In a pottery fabricating machine, a turret member, a plurality of fabricating tools mounted on said member, reciprocable and rotatable chucks, a plurality of open-bottom trays connected in series by an endless flexible conveyor, means for advancing said trays in a substantially rectilinear plane between said turret and said chucks, and means for imparting intermittent angular motion to said chucks, and means for imparting intermittent angular motion to said turret member.

8. In apparatus of the class specified, a tool carriage, comprising a turret, vertically and horizontally movable frame components on which said turret is mounted, a system of cam-actuated levers for imparting angular movement to said turret and vertical and horizontal movement to said frame components, and means for adjusting the throw of said levers while acting to move said turret and frame components.

9. In apparatus of the class specified, the combination with a plurality of molds and means for advancing said molds in series in a substantially rectilinear plane, of a turret member having a multiple of profiles mounted thereon, means for imparting intermittent angular movement to the turret in synchronism with the advancing molds, and means for moving the turret vertically and horizontally.

10. In apparatus of the class specified, a turret member, a plurality of profiles mounted thereon, trimmers mounted in conjunction with certain of the profiles and adapted to be moved into operative position, means for imparting intermittent angular movement to the turret to move the profiles into operative position, and cam means for moving the trimmers into operative position.

11. In apparatus of the class specified, a turret member, a plurality of profiles mounted thereon, each of said profiles being formed with a clay receiving zone in communication with the working edge of the profile and terminating in a conduit member, means for imparting intermittent angular movement to the turret to move the profiles into operative position, and a relatively stationary conduit mounted adjacent the turret, the receiving end of said latter conduit being adapted to register with the terminal end of said first-named conduit when each profile moves into operative position.

12. In apparatus for jiggering potteryware, a profile unit arranged to make different pieces of pottery ware in combination with a pottery mold conveyor and a reciprocable pottery mold support on which molds are presented to the unit, said profile unit comprising, a support having a plurality of profiles for making different pottery ware shapes thereon, means for alternating the profiles and means for operating the profile alternating means in timed relation with the conveyor and the reciprocable mold support.

13. In apparatus for manufacturing potteryware, a feeder unit for feeding different sizes and volume clay charges to different capacity molds presented in succession thereto in a single line in combination with a multiple profile unit for profiling different ware shapes in succession on the previously charged molds presented in succession in the said line.

14. In apparatus for manufacturing potteryware, means for successively feeding clay charges to different capacity molds in the correct volume required by each presented thereto in succession, means for spreading the clay on said molds, and means for profiling different ware shapes in succession.

15. In combination, a conveyor transporting different size and shapes of molds, a plurality of molds located on said conveyor, a clay feeder having a plurality of discharge nozzles arranged to charge said molds with clay in successive order, a plurality of dies arranged to be alternately co-operated with corresponding molds and a plurality of profiles arranged to be alternately co-operated with corresponding molds.

16. In a pottery fabricating machine, a plurality of fabricating tools arranged on a common mounting, a plurality of pottery molds and means for co-operating pottery molds with said fabricating tools, means for altering the mounting to bring different fabricating tools into co-operation with the molds to form different pieces of ware in said molds, means for transporting molds to and from the zone of fabrication said fabricating tools comprising forming members movable axially of the molds for depositing mold charges in the molds and shaping the same therein.

17. In apparatus for the manufacture of pottery ware, charge feeding and batting out mechanism which comprises a support, a plurality of charge forming mechanisms associated with said support, a batting out die associated with each charge forming mechanism and means for alternating said charge feeding and batting out mechanisms at the feeding and batting out position to thereby diversify the production.

18. In apparatus for the manufacture of potteryware, a clay feeding and forming mechanism which comprises a plurality of charge forming devices arranged on a common support, an open center batting out die associated with each charge forming device and means for alternating the charge forming devices and dies at the feeding position.

19. In apparatus for the manufacture of potteryware, mechanism for batting out clay on molds comprising a support having a plurality of batting out heads having diversely contoured working surfaces thereon and means for alternating said heads at the batting out position to thereby diversify the production.

20. In a machine for making potteryware, the combination of a batting out mechanism comprising a plurality of batting out heads for making ware pieces of different kinds together with means for alternating the heads at the batting position and a jiggering mechanism comprising a plurality of profiling instrumentalities and means for alternating said instrumentalities at the profiling position, said batting out and profiling mechanisms being arranged adjacent a common line of molds for co-operation with the molds arranged in said line.

21. In a pottery machine, the combination of means for successively depositing mold charges in and shaping mold charges on molds including at least one axially movable forming member and a profiling mechanism including a plurality of profiles for making dissimilar pieces of ware, means for altering the profiling mechanism to alter the profiles at the profiling position to form different pieces of ware and means common to all of said profiles for supplying fluid to the work together with a mold carrier having continuous motion except in the forming and profiling positions, a series of molds mounted on the carriers and arranged by the movement of the carrier to be brought in turn into the aforesaid stations.

22. In a pottery fabricating machine, a turret member, a plurality of fabricating tools mounted thereon, said tools being of diverse character in order to produce a diversified production, reciprocable and rotatable chucks, a plurality of open bottom mold carrying trays connected in series by an endless flexible conveyor, means for advancing the said trays in a substantially rectilinear plane to a position adjacent said turret and said chucks, means for imparting intermittent angular motion to said turret member and means for elevating said chucks to remove molds from said trays and means for rotating said chucks to rotate the said molds incident to co-operation with the fabricating tools.

23. In apparatus for manufacturing diversified potteryware, a dryer, a mold conveyor, a fabricating machine mounted in conjunction with a conveyor having a multiple of preforming heads, each having a surface contour corresponding to that of a particular mold, means for alternating the heads at the preforming position as molds for different kinds of ware are presented thereto, a jiggering machine including a multiple of profiles each having an edge surface corresponding to that of a particular ware shape to be produced, and means for alternating said profiles so as to bring the corresponding profile into profiling position as the corresponding mold is presented thereto.

24. In apparatus for manufacturing diversified pottery-ware, a mold conveyor, a mold charging means, preforming means comprising a plurality of shaping heads mounted on a common support, means for alternating said heads at the preforming position, a jigger comprising a plurality of profiles mounted on a common support, means for alternating said profiles at the profiling position and means for synchronizing the operation of said alternating means and said conveyor.

25. In a pottery fabricating machine, mold charging mechanism and clay fabricating mechanism, said last named mechanism comprising a support, a plurality of fabricating means mounted thereon said fabricating means having diversely contoured fabricating surfaces, means for re-positioning the support to present various of the fabricating means at the fabricating position to thereby diversify the production.

26. In a pottery fabricating machine, a conveyor for molds, mold charging mechanism, ware fabricating mechanism said last named mechanism comprising a support on which a plurality of fabricating means are mounted said fabricating means having diversely contoured fabricating surfaces and means for selectively presenting various fabricating means at the fabricating position to thereby diversify the production.

27. In apparatus for the manufacture of pottery ware, a fabricating mechanism which comprises, a mounting arranged to support, a plurality of fabricating instrumentalities, means for rotating said mounting to alternate the fabricating instrumentalities at the fabricating position to thereby diversify the production and means for reversing the rotation of said mounting.

28. In combination, a conveyor transporting different sizes and shapes of molds, a plurality of molds located on said conveyor, a clay feeder arranged to charge said molds with clay in successive order, a plurality of dies arranged to be alternately co-operated with corresponding molds and a plurality of profiles arranged to be alternately co-operated with corresponding molds, there being means for trimming the brim of the ware incident to profiling together with means for collecting and disposing of the trimmings.

29. In a clay feeder, a plurality of means for feeding clay charges, means for alternating the charge feeding means at the feeding position, and means common to all said charge feeding means for supplying said charge feeding means with clay, said means including a hollow conduit adapted to be filled with clay and discharged into said feeding means.

30. In a mechanism for supplying plastic clay to molds, a plurality of mold charging means each having a clay receiving chamber and a delivery outlet, and means including a force applying device and a hollow conduit common to all said mold charging means for supplying the clay receiving chamber of said mold charging means with clay.

31. A clay feeder which includes means having a plurality of feeding orifices, means for alternating the orifices at the feeding position and a regulable source of clay supply common to all of said orifices including a hollow conduit adapted to be filled with plastic clay and force applying means for discharging the clay therefrom.

32. In apparatus for the manufacture of potteryware, a feeder for progressing different grades and mixtures of clay comprising a conduit having a plurality of charge forming devices associated therewith for preparing and feeding charges to a plurality of lines of molds, clay progressing and compacting means connected at both ends of the conduit and slide valves arranged along the conduit.

33. In apparatus for manufacturing potteryware, the combination of a carrier having a series of molds mounted thereon, a conduit for plastic material, charge feeding mechanisms, branches leading from said conduit to said feeding mechanism, means for forcing clay under pressure into said conduit and means for interrupting the supply of clay to any one of said charge feeding mechanisms without interrupting the supply of clay to any other of said charge feeding mechanisms.

34. In apparatus for manufacturing pottery articles, a carrier for molds having a series of molds thereon, a plurality of charge feeding mechanisms arranged adjacent the line of travel of said conveyor and adapted to prepare and deposit a plurality of mold charges simultaneously in a plurality of molds, means for supplying said charge feeding mechanisms with clay comprising a conduit having branches associated with said charge feeding mechanisms, means for forcing clay under pressure into the conduit from at least one end, said charge feeding mechanisms and said carrier being synchronously operated.

35. In a clay supplying mechanism for use with pottery making machinery, a clay compacting and extruding mechanism, drive means therefor selectively regulable to predetermine the rate and amount of extrusion, a conduit connected to said extrusion mechanism and into which the clay is forced under pressure, branches in said conduit leading to mold charging mechanisms associated with the pottery machine and individual valves controlling the passage of clay into said branches whereby any one or all of said branches may be selectively closed or opened.

36. The method of feeding clay to molds which comprises, progressing clay from opposite directions into the ends of a conduit and diverting the clay into the production lines before the opposed advancing columns meet in the conduit.

37. In apparatus of the class described, a plurality of mold charging means each having a clay receiving chamber and a delivery outlet, means forming a conduit for progressing clay into said clay receiving chambers and an axially movable implement associated with each mold charging means for discharging clay through said outlet, means for filling said conduit with clay, each of said mold charging means being individually regulable to vary the volume of clay in the charge produced.

38. In combination, a charge feeding mechanism having means for producing charges for making a succession of different ware shapes varying in the amount of clay contained in each, and mold conveying means for successively presenting diverse molds at the feeding position, said charge feeding mechanism operating repeated cycles and the molds being arranged in corresponding groups.

39. In the automatic mass production manufacture of dinnerware, the method which consists in advancing a line of diverse molds for making different ware shapes through a feeding station and successively feeding charges of clay thereto and automatically varying the amount of clay charged into each mold.

40. The method of feeding clay to molds which comprises, forcing clay under pressure into a conduit, directing the clay into several outlets each of which is directly over a line of molds and forcing the clay into the molds by the movement of an implement axially thereof.

41. In combination, a mold carrier, molds disposed thereon, a plurality of mold charging means each having a clay receiving chamber and a delivery outlet, a hollow conduit common to all of said mold charging means for supplying clay to the clay receiving chambers thereof and means for progressing clay into said conduit.

42. In combination with a mold carrier having molds disposed thereon, a plurality of mold charging means having a clay receiving chamber and a delivery outlet, segregating means, hollow conduit means for supplying said chambers with clay, means for supplying clay to said conduit and means for regulating the discharge of clay from said outlets.

43. In combination, a mold carrier having molds disposed thereon, mold charging means having a clay receiving chamber and a delivery outlet, means for supplying clay to said clay receiving chamber comprising a hollow member for enclosing the clay with substantial exclusion of air through which the clay is progressed into said clay receiving chamber, and means for filling said member with clay.

44. In combination, a mold carrier having molds disposed thereon, mold charging means having a clay receiving chamber and a delivery outlet, means for supplying clay thereto in the form of a hollow conduit, means for extruding clay into said conduit and means for regulating the rate of extrusion.

45. In apparatus for the manufacture of pottery ware, means for supplying clay to molds including a plurality of mold charging means each having a clay receiving chamber and a delivery outlet, an elongated conduit located adjacent thereto and communicating with the aforesaid clay receiving chambers, clay extrusion means operatively connected at one or both ends of the conduit for progressing clay thereinto, means for regulating the amount of clay extruded into said conduit and means for regulating the volume of clay contained in the charges produced by said mold charging mechanisms.

46. In apparatus for supplying clay to molds in the manufacture of pottery ware the combination which comprises, a plurality of mold charging means each having a clay receiving chamber and a delivery orifice, an elongated conduit adapted to be connected with the clay receiving chambers of said mold charging means, means for progressing clay into said conduit and means for regulating pressure applied to the clay in said conduit.

47. The method of feeding clay to molds which comprises, progressing clay from a source of extrusion in one or more columns into a hollow conduit and diverting the clay at spaced points along the conduit into separate streams and segregating each stream of clay into mold charges.

48. The method of supplying clay to molds in the manufacture of jiggered pottery ware which comprises, extruding clay directly into a hollow conduit and then progressing the clay along said conduit with substantial avoidance of exposure to atmosphere, diverting the clay into one or more discharge outlets and then progressing the clay therethrough and segregating charges therefrom, depositing the charges on molds and by cooperation with a non-adhesive matrix spreading the clay over the surface of the molds to thereby form a jiggering blank and adhesively bond the clay to the molds.

49. In apparatus for supplying plastic clay to molds, a plurality of mold charging means each having a clay receiving chamber and a delivery outlet, means including a force applying device and a hollow conduit common to all of said mold charging means for supplying the clay receiving chamber of said mold charging means with clay and means for interrupting the mold charging function of any one of said mold charging means.

50. In combination with a mold carrier having molds disposed thereon, a plurality of mold charging means each having a clay receiving chamber and a delivery outlet, segregating means, conduit means for supplying said chambers with clay, means for supplying clay to said conduit, means for regulating the discharge of clay from said outlets and means for interrupting the mold charging function of any one of said mold charging means, individually of the other.

51. In apparatus for feeding clay to a succession of pottery molds, chambered means having delivery outlets through which plastic clay is delivered in consecutive charges to said molds, hollow conduit means for conducting clay to said chambers, force applying means operatively connected to said hollow conduit means for progressing clay into said chambers and outlets, the feed to the succession of molds being alternated between delivery outlets.

52. In apparatus for feeding clay to a succession of pottery molds arranged in one or more lines, chambered means having sets of delivery outlets through which plastic clay is delivered to molds in consecutive charges, hollow conduit means for conducting clay to said chambers, force applying means operatively connected to said hollow conduit means for progressing clay into said chambers and said outlets, the feed being alternated between sets of outlets.

53. In apparatus for feeding clay to molds, a plurality of clay receiving chambers with downwardly opening delivery outlets, the feed through the aforesaid outlets being alternated, one outlet being inoperative whilst the other is working, means for supplying plastic clay to said chambers including hollow conduit means adapted to be filled with clay and discharged thereinto, means for transporting a succession of molds into feeding position relative to said outlets and means for segregating clay charges.

54. In the feeding of plastic clay to a succession of pottery molds, the method which consists in, progressing clay from a source of supply into a hollow conduit, bringing into registry the hollow conduit and a chamber having a downwardly opening delivery outlet and applying pressure to the clay in said conduit to discharge the same into said chamber and delivery orifice and by the movement of a segregating member, severing charges of clay therefrom in consecutive order.

55. In combination with apparatus for advancing a line of pottery molds along a generally horizontal path wherein clay is formed on the molds into articles of pottery, a plurality of clay discharge nozzles through which clay may be fed, clay passages for the several nozzles extending back to inlets removed therefrom, and means for supplying clay under controlled pressure to the inlet of a selected passage, each nozzle being above the general path of travel of the molds and adapted selectively to feed clay charges to successive molds moving in said path.

56. In combination with apparatus for advancing a line of pottery molds along a generally horizontal path wherein clay is formed on the molds into articles of pottery, a plurality of clay discharge nozzles through which clay may be fed, clay passages for the several nozzles extending back to inlets removed therefrom, and means for supplying clay under controlled pressure to the inlet of a selected passage, each nozzle being above the general path of travel of the molds and adapted selectively to feed clay charges of a size or weight predetermined for the particular nozzle to successive molds in said path.

57. In combination with apparatus for advancing a line of pottery molds along a general horizontal path wherein clay is formed on the molds into articles of pottery, a plurality of clay discharge nozzles through which clay may be fed, clay passages for the several nozzles extending back to inlets removed therefrom, means for supplying clay under controlled pressure to the inlet of a selected passage, each nozzle being above the general path of travel of the molds and adapted selectively to feed clay charges to successive molds moving in said path, and means operative in timed relation to the movement of a mold into charge-receiving position beneath the selected nozzle for effecting severance of charges fed thereby.

58. In combination with apparatus for advancing a line of pottery molds along a generally horizontal path wherein clay is formed on the molds into articles of pottery, a plurality of clay discharge nozzles through which clay may be fed, clay passages for the several nozzles extending back to inlets removed therefrom, means for supplying clay under controlled pressure to the inlet of a selected passage, each nozzle being above the particular path of travel of the molds and adapted selectively to feed clay charges to successive molds moving in said path and means for each nozzle for controlling the size or weight of successive charges fed therefrom.

59. An apparatus for feeding clay charges to a single line of pottery ware molds which comprises, in combination, a plurality of feeders each having a discharge orifice superimposed relative to said line of molds, means operable to substitute the feed through one discharge orifice for the feed through another discharge orifice to the line of molds, means for segregating clay charges associated with said discharge outlets and mechanism by means of which the volume contained in the charges of clay may be varied.

60. An apparatus for feeding clay charges including a plurality of feeders arranged on a common support, means for alternating the feeders at the working position and means for varying the size and volume of the charges.

61. In combination, an apparatus for feeding clay charges to molds including a plurality of feeders arranged on a common support, means for alternating the feeders at a mold charging position, means for varying the size and volume of the charges and a conveyor for transporting molds in succession to the charging position.

62. In combination with means for supporting and transporting a single line of jigger molds to a clay feeding zone, clay feeding apparatus for charging jigger molds in the line with clay including a plurality of clay feeders each having clay extruding mechanism and means for automatically substituting one feeder and mechanism for another in the feeding of clay to the single line of molds.

63. In apparatus for feeding clay to a single line of jigger molds, a plurality of clay feeders each having clay extruding mechanism, means for varying the amount of clay extruded thereby to regulate the amount of clay fed to the jigger molds, means for supporting and transporting a single line of jigger molds to the feeding zone and means for automatically substituting one feeder and mechanism for another in the feeding of clay to the single line of molds.

WILLIAM J. MILLER.